(12) United States Patent
Connolly

(10) Patent No.: US 9,664,596 B2
(45) Date of Patent: May 30, 2017

(54) VEHICLE EMISSIONS TEST SYSTEMS AND METHODS

(71) Applicant: GENERAL ELECTRIC COMPANY, Schenectady, NY (US)

(72) Inventor: Paul Connolly, Erie, PA (US)

(73) Assignee: General Electric Company, Schenectady, NY (US)

( * ) Notice: Subject to any disclaimer, the term of this patent is extended or adjusted under 35 U.S.C. 154(b) by 581 days.

(21) Appl. No.: 14/186,018

(22) Filed: Feb. 21, 2014

(65) Prior Publication Data

US 2015/0241307 A1    Aug. 27, 2015

(51) Int. Cl.
*G01M 15/10* (2006.01)

(52) U.S. Cl.
CPC ................................. *G01M 15/108* (2013.01)

(58) Field of Classification Search
CPC .......................... G01M 15/102; G01M 15/108
See application file for complete search history.

(56) References Cited

U.S. PATENT DOCUMENTS

| | | |
|---|---|---|
| 4,213,119 A | 7/1980 | Ward et al. |
| 4,688,026 A | 8/1987 | Scribner |
| 5,008,661 A | 4/1991 | Raj |
| 5,032,083 A | 7/1991 | Friedman |
| 5,470,233 A | 11/1995 | Fruchterman et al. |
| 5,528,248 A | 6/1996 | Steiner et al. |
| 5,705,818 A | 1/1998 | Kelbel et al. |
| 5,938,721 A | 8/1999 | Dussell et al. |
| 6,078,826 A | 6/2000 | Croft et al. |
| 6,266,612 B1 | 7/2001 | Dussell et al. |
| 6,317,060 B1 | 11/2001 | Jones |
| 6,411,899 B2 | 6/2002 | Dussell et al. |
| 6,446,004 B1 | 9/2002 | Cao et al. |
| 6,453,237 B1 | 9/2002 | Fuchs et al. |
| 6,621,452 B2 | 9/2003 | Knockeart et al. |
| 6,671,698 B2 | 12/2003 | Pickett et al. |
| 6,738,572 B2 | 5/2004 | Hunter |
| 6,898,517 B1 | 5/2005 | Froeberg |
| 6,947,976 B1 | 9/2005 | Devitt et al. |
| 7,107,038 B2 | 9/2006 | Fitch et al. |

(Continued)

FOREIGN PATENT DOCUMENTS

| | | |
|---|---|---|
| EP | 0970870 A2 | 1/2000 |
| EP | 1081659 A1 | 3/2001 |

(Continued)

OTHER PUBLICATIONS

Mazzoleni et al., Monitoring Automotive Particulate Matter Emissions with LiDAR: A Review, 2010, Remote Sens., vol. 2, pp. 1077-1119.*

(Continued)

*Primary Examiner* — Toan Le
(74) *Attorney, Agent, or Firm* — Global Patent Operation; John A. Kramer

(57) ABSTRACT

A system may include an imaging device configured to acquire at least one image of a vehicle that emits exhaust, and an emissions test unit configured to receive the image(s) of the vehicle. The emissions test unit may include at least one processor configured to detect exhaust data from the image(s) and determine a vehicle emissions test result through an analysis of the exhaust data.

18 Claims, 5 Drawing Sheets

(56) References Cited

U.S. PATENT DOCUMENTS

| | | |
|---|---|---|
| 7,212,828 B2 | 5/2007 | Hind et al. |
| 7,776,505 B2 | 8/2010 | Gonsalves |
| 7,821,542 B2 | 10/2010 | Lee et al. |
| 8,244,276 B2 | 8/2012 | Wetzel et al. |
| 2002/0049538 A1 | 4/2002 | Knapton |
| 2003/0013458 A1 | 1/2003 | Yabe et al. |
| 2003/0017821 A1 | 1/2003 | Irvin |
| 2003/0061005 A1 | 3/2003 | Manegold et al. |
| 2003/0061159 A1 | 3/2003 | Adams et al. |
| 2003/0069694 A1 | 4/2003 | Fuchs et al. |
| 2003/0132855 A1 | 7/2003 | Swan |
| 2003/0134626 A1 | 7/2003 | Himmel et al. |
| 2005/0023347 A1 | 2/2005 | Wetzel |
| 2005/0171661 A1 | 8/2005 | Abdel-Malek |
| 2005/0209777 A1 | 9/2005 | Peltz |
| 2007/0150130 A1 | 6/2007 | Welles |
| 2007/0194115 A1 | 8/2007 | Logan |
| 2013/0181836 A1* | 7/2013 | Cardoso .............. G01M 15/108 340/540 |

FOREIGN PATENT DOCUMENTS

| | | |
|---|---|---|
| EP | 1280119 A1 | 1/2003 |
| GB | 2375407 A | 11/2002 |

OTHER PUBLICATIONS

Electronic ERA Test and Inspection System; General Overview 10East teams up with Sharp Electronics to equip CSX maintenance forces with a data collection, management, and reporting solution for monitoring Federally mandated safety compliance of the railroads infrastructure. 10East, Inc. (7 pgs.), 2009.

Electronic FRA Test and Inspection System, General, Overview. 10EAST, Inc. (16 pgs.), 2009.

Personal Mobile Tool. 10EAST, Inc.; www.10EAST.com/index.cgi?sect=personal mobile tool (3 pgs.) Jul. 28, 2003.

Sun Microsystems. Sun's Java 2 Platform, Micro Edition (J2ME) Enables Wireless Phone to Serve as Cost-Effective Input Device for Mobile Task Management Solution. WiredTime.com, 2009.

* cited by examiner

VEHICLE EMISSIONS TEST SYSTEMS AND METHODS

BACKGROUND

Field

Embodiments of the present disclosure relate to systems and methods for testing emissions of vehicles.

Background

Various powered vehicles emit exhaust during operation. For example, exhaust from a typical automobile may include smoke, carbon dioxide, carbon monoxide, water vapor, and various contaminants, pollutants, and the like.

In order to ensure that vehicle emissions are environmentally acceptable, vehicles may be periodically tested. If a vehicle's emissions are within an acceptable range, the vehicle may continue to be operated. If, however, the emissions are outside of the acceptable range, the vehicle may be required to be modified or changed in order to continue operation.

The United States Environmental Protection Agency (the "EPA") provides various regulations and standards for vehicle emissions. For example, the EPA provides exhaust emission standards for oxides of nitrogen, hydrocarbons, carbon monoxide, particulate matter, and smoke for vehicles such as locomotives. One type of smoke test is referred to as a "Visible Emission Reduction and Repair Program." In one exemplary emissions test, a locomotive is first viewed while it idles. The locomotive is then run at an elevated level, such as a maximum engine level (for example, Notch-8). At the elevated engine level, the locomotive emits exhaust, such as smoke. An individual may refer to numerous slides or screens that depict various exhaust colors, densities or the like. The individual compares the exhaust from the locomotive with the slides or screens to match the exhaust level with one of the slides or screens. Each slide or screen is associated with a particular emissions level. As such, once the individual matches a particular slide or screen with the emitted exhaust from the locomotive, the individual is able to determine the emissions level of the locomotive. Based on the match, the individual is able to determine if the locomotive passes or fails the emissions test.

As can be appreciated, however, the emissions test is typically a manual process that is susceptible to human error. Moreover, the process of visually inspecting exhaust from a vehicle and matching it with physical templates, slides, screens, sheets, or the like is highly subjective. For example, one individual may determine that a particular exhaust from a vehicle is a certain color or density, while another individual may determine that the same exhaust is another color or density. As such, current processes for performing tests may be inaccurate.

BRIEF DESCRIPTION

Certain embodiments of the present disclosure provide a system that comprises an emissions test unit configured to receive, from an imaging device, at least one image of the vehicle that emits exhaust. The emissions test unit comprises at least one processor configured to detect exhaust data from the image(s) and determine a vehicle emissions test result through an analysis of the exhaust data. In another embodiment, the system further comprises the imaging device, which is configured to acquire the at least one image of the vehicle; for example, the emissions test unit and imaging device may be co-located in a common housing. In either case (emissions test unit by itself, or in conjunction with the imaging device), the system may include a housing in which the emissions test unit (and, in embodiments, the imaging device) is housed, and which is handheld and portable.

In another embodiment, the imaging device is configured to acquire the at least one image as a digital image, and/or as an image in a human-visible spectrum. In another embodiment, additionally or alternatively, the image is an image external to the vehicle, e.g., an exterior image of the vehicle. Imaging devices configured to acquire digital, human visible spectrum images include digital cameras, such as digital SLR's and digital cameras that are built into devices that perform functions other than image capture (e.g., mobile phones, tablet computers).

The system may also include an emissions database. The processor(s) may be further configured to compare the exhaust data with a plurality of emissions control parameter levels stored in the emissions database and match the exhaust data with a particular one of the plurality of emissions control parameter levels.

In at least one embodiment, the processor(s) may be further configured to account for environmental conditions when determining the vehicle emissions test result. Additionally, the processor(s) may be further configured to provide a recommendation based on the vehicle emissions test result. The recommendation may relate to one or more of a future vehicle emissions test, continued operation of the vehicle, a modification to the vehicle, and/or maintenance (such as oil changes, engine cleaning, and/or the like) of the vehicle.

In at least one embodiment, the imaging device and the emissions test unit are contained within a common housing. For example, the imaging device and the emissions test may be part of a smart device, such as a smart phone or tablet. Alternatively, the imaging device may be remote from the emissions test unit.

The vehicle may be or include a locomotive. Alternatively, the vehicle may be or include an automobile, bus, motorcycle, aircraft, powered boat, or the like.

Certain embodiments of the present disclosure provide a method that comprises receiving at least one image (e.g., digital image) of a vehicle at an emissions test unit (the vehicle emits exhaust), and using at least one processor to: detect exhaust data from the image(s), perform an analysis of the exhaust data, and determine a vehicle emissions test result based on the analysis of the exhaust data.

The method may also include using the processor(s) to compare the exhaust data with a plurality of control parameter levels stored in the emissions database, and match the exhaust data with a particular one of the plurality of control parameter levels.

The method may also include using the processor(s) to account for environmental conditions when determining the vehicle emissions test result.

The method may also include using the processor(s) to provide a recommendation based on the vehicle emissions test result. The recommendation may relate to one or more of a future vehicle emissions test, continued operation of the vehicle, a modification to the vehicle, and/or maintenance of the vehicle.

Certain embodiments of the present disclosure provide a system that may include an imaging device configured to acquire at least one image of a vehicle that emits exhaust, and an emissions test unit configured to receive the image(s) of the vehicle. The emissions test unit may include an exhaust detection module configured to detect exhaust data from the image(s), and a test analysis module configured to determine a vehicle emissions test result through an analysis of the exhaust data.

In at least one embodiment, the emissions test unit may also include an emissions database that stores a plurality of emissions control parameter levels, and a comparison module configured to compare the exhaust data with the plurality of emissions control parameter levels stored in the emissions database and match the exhaust data with a particular one of the plurality of emissions control parameter levels. The test analysis module determines the vehicle emissions test result through the match.

In at least one embodiment, the emissions test unit may also include an environmental modification module configured to modify one or more of the exhaust data, the plurality of emissions control parameter levels, or the vehicle emissions test result based on environmental conditions of a location of the vehicle.

In at least one embodiment, the emissions test unit may also include a recommendation module configured to provide a recommendation based on the vehicle emissions test result. The recommendation may relate to one or more of a future vehicle emissions test, continued operation of the vehicle, a modification to the vehicle, and/or maintenance of the vehicle.

Another embodiment relates to a system comprising a handheld, portable housing, an imaging device, and an emissions test unit. The imaging device is housed in the housing and is configured to acquire images of an exterior of a locomotive or other vehicle that emits exhaust to the atmosphere. The emissions test unit is housed in the housing and is electrically coupled to the imaging device to receive the images of the vehicle. The emissions test unit includes at least one processor configured to: detect exhaust data from the at least one image; determine a vehicle emissions test result through an analysis of the exhaust data; and generate an output signal of the emissions test result, e.g., the output signal may be for controlling a display connected to the housing to display the test result.

BRIEF DESCRIPTION OF THE DRAWINGS

The foregoing brief description, as well as the following detailed description of certain embodiments of the presently described subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The disclosure will be better understood from reading the following description of non-limiting embodiments, with reference to the attached drawings, wherein below.

DETAILED DESCRIPTION

Embodiments of the disclosure relate to systems and methods for performing a vehicle emissions test for a vehicle, such as an automobile, train locomotive, bus, aircraft, and/or the like. The systems and methods may include taking one or more images of a vehicle during a testing procedure and comparing imaged exhaust from the vehicle with a collection of exhaust images or data that may be digitally stored within a database, for example, in order to efficiently, accurately, and objectively determine whether or not the vehicle passes the emissions test. The image of the vehicle may include an image of the vehicle and exhaust emitted from the vehicle, or only the exhaust emitted from the vehicle, for example.

Figure 1:
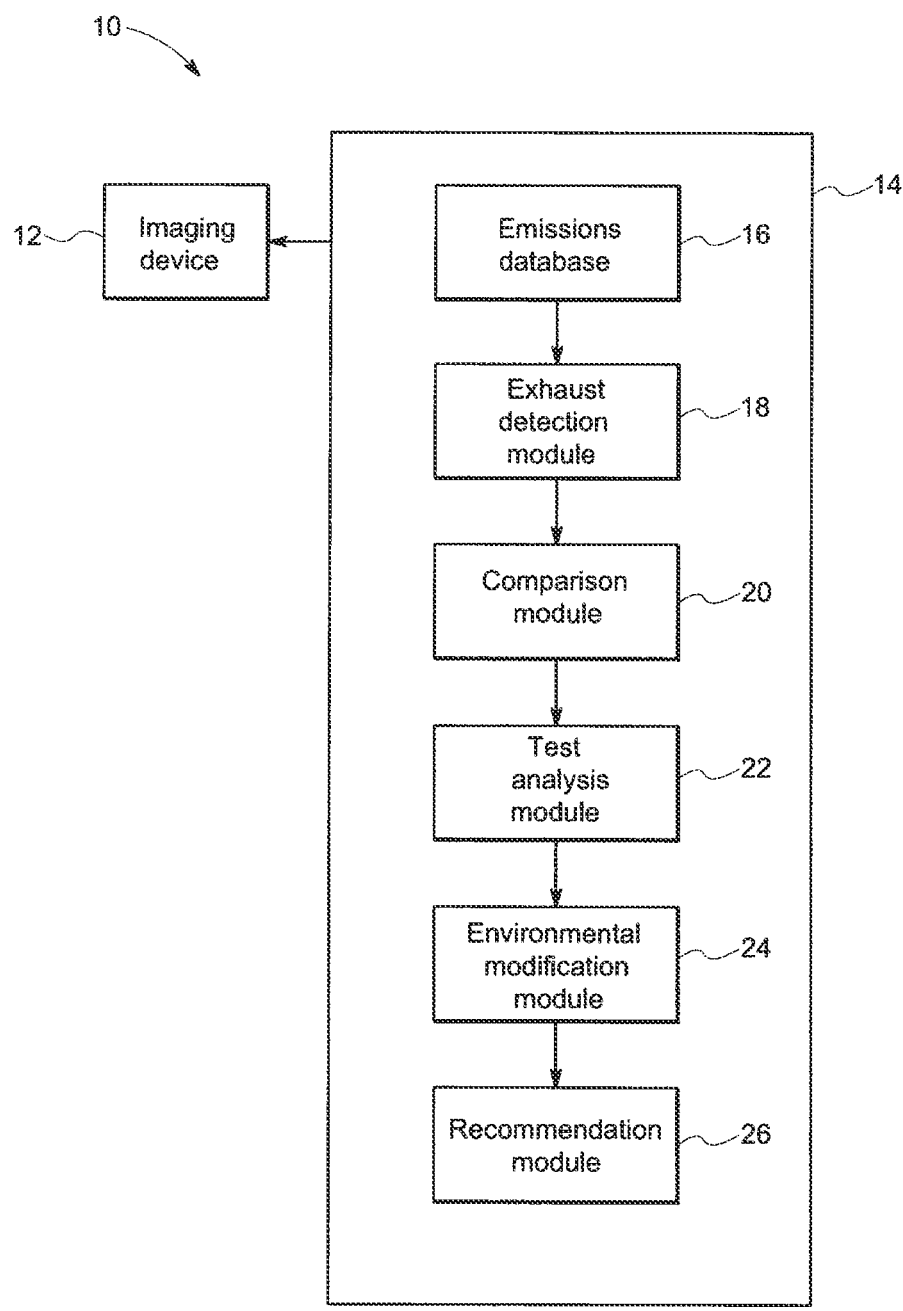
FIG. 1 illustrates a schematic diagram of a vehicle emissions test system, according to an embodiment of the present disclosure.

FIG. 1 illustrates a schematic diagram of a vehicle emissions test system 10, according to an embodiment of the present disclosure. The vehicle emissions test system 10 may include an imaging device 12 in communication with an emissions test unit 14. The imaging device 12 may be a stand-alone digital camera, for example, that may be operatively connected to the emissions test unit 14, such as through a wired or wireless connection. For example, the imaging device 12 may communicate with the emissions test unit 14 through a Wi-Fi connection. The emissions test unit 14 may be contained within a housing of a personal computer, laptop computer, electronic tablet, smart phone, and/or the like. Alternatively, the imaging device 12 may be part of the emissions test unit 14. For example, the imaging device 12 and the emissions test unit 14 may be part of a smart device, such as a smart cellular telephone, tablet, and/or the like. The smart device may be an electronic device, such as a cellular telephone, tablet, and/or the like, that may connect to other devices, networks, or the like through different protocols, such as Bluetooth, 3G, 4G, WiFi, and the like. The smart device may include artificial intelligence and may be configured to operate interactively and autonomously.

The emissions test unit 14 may include an emissions database 16, an exhaust detection module 18, a comparison module 20, a test analysis module 22, an environmental modification module 24, and a recommendation module 26. Each of the modules 18, 20, 22, 24, and 26 may be or include one or more computing devices, such as processors, circuits/circuitry, and/or the like. Optionally, each of the modules 18, 20, 22, 24, and 26 may be part of a single computing device, such as a processor, circuit/circuitry, and/or the like, that is configured to operate as described below. The terms "computer" or "module" may include any processor-based or microprocessor-based system including systems using microcontrollers, reduced instruction set computers (RISC), application specific integrated circuits (ASICs), logic circuits, and/or any other circuit or processor capable of executing the functions described herein. The above examples are exemplary only, and are thus not intended to limit in any way the definition and/or meaning of the term "computer" or "module."

The emissions database 16 may include a memory component, such as random access memory (RAM), read-only memory (ROM), for example, that stores emissions control parameter levels, such as exhaust color, density, and/or the like. For example, the emissions database 16 may store a plurality of known exhaust colors or densities that are associated with various levels of emissions. For example, a first exhaust level, such as a color of a first shade, density, and/or the like, may be associated with a first emissions test result, while a second exhaust level, such as a color of a second shade, density, and/or the like, may be associated with a second emissions test result. Various emissions test results may be associated with various exhaust levels. The emissions test results may further be associated with various levels of test compliance, from test pass to test fail.

The exhaust detection module 18 may be configured to detect the exhaust level from one or more images of a vehicle. The exhaust detection module 18 may detect exhaust that is emitted from the vehicle as exhaust data. For example, the exhaust detection module 18 may determine a color of exhaust from one or more images of the vehicle. Optionally, the exhaust detection module 18 may compare two images of the same vehicle at different levels of operation to detect the emitted exhaust. For example, the exhaust detection module 18 may compare an image of a vehicle at idle with an image of the vehicle at an elevated state of engine operation (such as Notch-8 of a locomotive) while in neutral and/or a braked condition. The exhaust detection module 18 may discern the difference between the two images (such as by subtracting image data of the second image from that of the first image) to identify and detect the exhaust data, which relates to the actual exhaust emitted from the vehicle.

Alternatively, the exhaust detection module 18 may detect an exhaust level by simply contrasting the opacity of the exhaust of the vehicle at idle in relation to the elevated engine level, such as Notch 8, for example. By comparing the amount of light in the area at the different engine levels as well as the amount of light in the image(s) devoid of exhaust, the exhaust detection module 18 may determine the opacity of the exhaust. As such, embodiments of the present disclosure may be configured to determine exhaust levels by comparing and contrasting exhaust levels at different engine levels without the use of a database of stored exhaust levels.

The comparison module 20 may be configured to compare the exhaust data identified and detected by the exhaust detection module 18 with the plurality of emissions control parameter levels stored within the emissions database 16. For example, the comparison module 20 may compare the color, density, and/or the like of the exhaust data detected by the exhaust detection module 18 and match the exhaust data with a particular stored emission control parameter level.

The test analysis module 22 may determine a test level of the vehicle based on the match of the exhaust data with the particular stored emissions control parameter level. The test analysis module 22 may then assign a test result to the test level. For example, the test analysis module 22 may determine that the vehicle passed or failed the emissions test based on the match of the exhaust data with the particular stored emissions control parameter level. Each emissions control parameter level may be associated with a particular test result, such as exceptional, very good, decent, fair, borderline, fail, and/or the like.

The test analysis module 22 may also store data regarding the test procedure. For example, the test analysis module 22 may communicate with the imaging device 12 and/or a display of a computer that directs an individual how to perform the test. In at least one embodiment, the test analysis module 22 may display instructions regarding acquiring image(s), submitting the images to the emissions test unit 14, displaying test results, and the like.

The environmental modification module 24 stores environmental modification rules that may be used to modify the exhaust data detected by the exhaust detection module 18 and/or the emissions control parameter levels based on environmental conditions, such as temperature, humidity, barometric pressure, cloud cover, altitude, brightness, and/or the like. As an example, location information of the vehicle may be input to the emissions test unit 14, such as through a keyboard, mouse, and/or the like. Optionally, the imaging device 12 and/or the emissions test unit 14 may include a location-determining unit, such as a Global Positioning System (GPS) device that is able to precisely pinpoint the location of the imaging device 12 and/or the emissions test unit 14 and send the location data to the environmental modification module 24. The environmental modification module 24 may then access environmental conditions of the location of the imaging device 12 and/or the emissions test unit 14, such as through a communication link (for example, the internet), with an environmental conditions monitoring system (such as a weather website, station, channel, or the like) that is able to provide environmental conditions for the precise location at the particular time the imaging device 12 acquired the image(s) that are submitted to the emissions test unit 14. The environmental modification module 24 may then modify the exhaust data and/or the emissions control parameter levels based on the environmental conditions. The environmental modification module 24 may account for various humidity levels, altitudes, temperatures, barometric conditions, cloud cover, brightness, wind, and/or the like to modify the test results, exhaust data and/or the emissions control parameter levels accordingly. As an example, high temperature, humidity, and/or barometric pressure levels may distort the actual exhaust data of the vehicle. As such, the environmental modification module 24 may reduce the exhaust data one or more levels based on the degree of the distorting environmental factors.

As another example, increased wind levels may disperse the exhaust emitted from a vehicle. As such, the environmental modification module 24 may increase the exhaust data one or more levels based on the presence of wind in the area of the vehicle.

Further, if the cloud level is at a certain level within the area of the vehicle, the environmental modification module 24 may provide an alert indicating that the test should not proceed. For example, the cloud level may be so thick that the exhaust detection module 18 may not be able to accurately detect the exhaust data from the image(s) of the vehicle.

Alternatively, the emissions test unit 14 may not include the environmental modification module 24.

The recommendation module 26 may review the test result of the vehicle determined by the test analysis module 22 (and, for example, modified by the environmental modification module 24) and generate a recommendation in relation to the vehicle. For example, the recommendation module 26 may determine a date of a subsequent emissions test for the vehicle based on the test result. If the test result was exceptional, the recommendation module 26 may recommend a subsequent test within 2 or more years, for example. If the test result was borderline, the recommendation module 26 may recommend a subsequent test within 2 or less weeks. If the test result was a fail, the recommendation module 26 may recommend steps to bring the exhaust level of the vehicle into compliance with the emissions test. For example, the recommendation module 26 may provide a recommendation that indicates one or more of replacement of certain engine parts and/or exhaust devices, a change to different types of fuels, operation restricted to certain operational speeds, engine overhaul, and/or the like. The recommendation module 26 may display the recommendation to an individual, such as on a monitor of the emissions test unit 14 and/or the imaging device 12. Additionally, the recommendation module 26 may communicate the recommendation to remote locations, such as a central vehicle registry, a future destination for the vehicle determined through a vehicle destination manifest (for example, a train that passes between various locations), and/or the like.

Alternatively, the emissions test unit 14 may not include the recommendation module 26.

In operation, the imaging device 12 is used to take one or more digital photographs of a vehicle. A first image may be taken while the vehicle is idling. A second image may be taken while the vehicle is in neutral and operated at an increased engine level. The image data is then received by the emissions test unit 14. For example, an individual may actively review the image data and send the image data to the emissions test unit 14. Alternatively, the image data may be automatically sent to the emissions test unit 14 upon acquisition of the image data.

After the image data is received by the emissions test unit 14, the exhaust detection module 18 analyzes the image data to detect the exhaust data within the image data. For example, the exhaust detection module 18 may compare the first and second images and isolate the exhaust data from the difference between the first and second images.

The comparison module 20 then compares the exhaust data with the emissions control parameter levels stored within the emissions database. The comparison module 20 matches the exhaust data with a particular emissions control parameter level, such as exhaust color, density, and/or the like.

The test analysis module 22 analyzes the matched data to determine a test result. The test analysis module 22 may determine a test result based on result data associated with the matched emissions control parameter level. The result data may be stored in conjunction with the emissions control parameter level in the emissions database 16, or the result data may be stored in a memory component of the test analysis module 22.

The environmental modification module 24 may modify the test result, the exhaust data, and/or the emissions control parameter level based on the current environmental conditions of the area in which the vehicle is located. As explained above, the imaging device 12 and/or the emissions test unit 14 may include a GPS device that transmits a precise location to the environmental modification module 24, which may then consult a system that determines the environmental conditions of the area at the time the images were acquired. The environmental modification module 24 may then modify the test results, the exhaust data, and/or the emissions control parameter level based on the environmental conditions of the area in which the vehicle is located, as described above. In general, the test result, which may be stored as result data, and or the exhaust data, including the images, may be recorded and stored for future upload, and/or immediately uploaded to a storage database that maintains test records.

Based on the test results, the recommendation module 26 may provide a recommendation regarding a subsequent test, vehicle modification, and/or the like. The recommendation may be communicated (such as through visual and/or audio signals) to an individual that acquired the images and/or a remote location.

Figure 2:
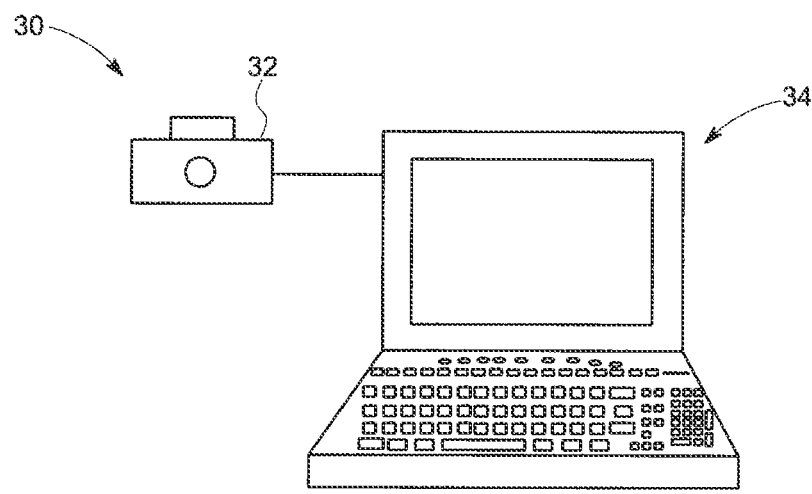
FIG. 2 illustrates a schematic diagram of a vehicle emissions test system, according to an embodiment of the present disclosure.

FIG. 2 illustrates a schematic diagram of a vehicle emissions test system 30, according to an embodiment of the present disclosure. The vehicle emissions test system 30 may include an imaging device 32, such as a digital camera, and an emissions test unit 14, which may be part of a personal or laptop computer. The vehicle emissions test system 30 is an example of the vehicle emissions test system 10, shown in FIG. 1. For example, the imaging device 32 is an example of the imaging device 12, while the emissions test unit 34 is an example of the emissions test unit 14.

Figure 3:
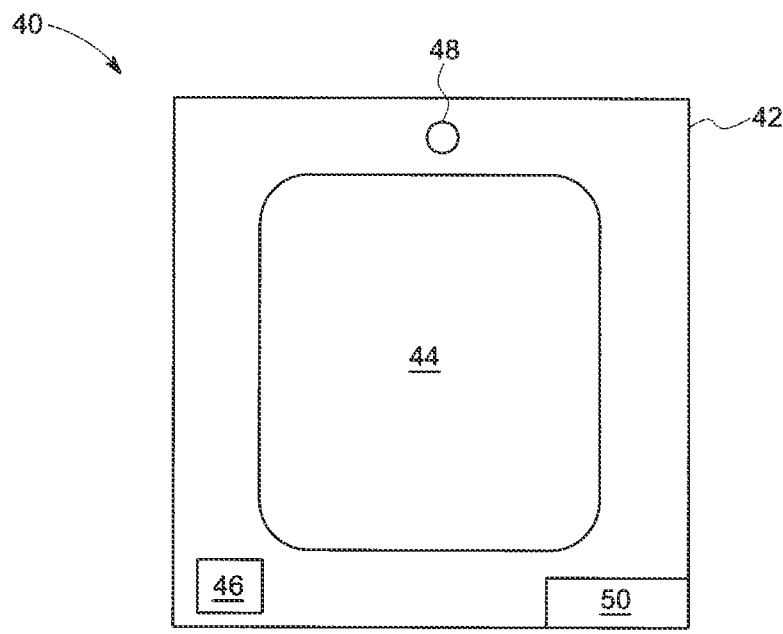
FIG. 3 illustrates a simplified diagram of a smart device, according to an embodiment of the present disclosure.

FIG. 3 illustrates a simplified diagram of a smart device 40, according to an embodiment of the present disclosure. The smart device 40 may include a housing 42 having a display 44. The smart device 40 may be a smart phone, such as an iPhone®, a tablet, such as an iPad®, and/or the like. The smart device 40 may include a location-determination device 46, such as a GPS unit, an imaging device 48, and an emissions test unit 50. As such, the smart device 40 may include a single device that contains an entire vehicle emissions test system 30, such as any the system 10. For example, the emissions test unit 50 may be downloaded as an application to a memory of the smart device 40.

Figure 4:
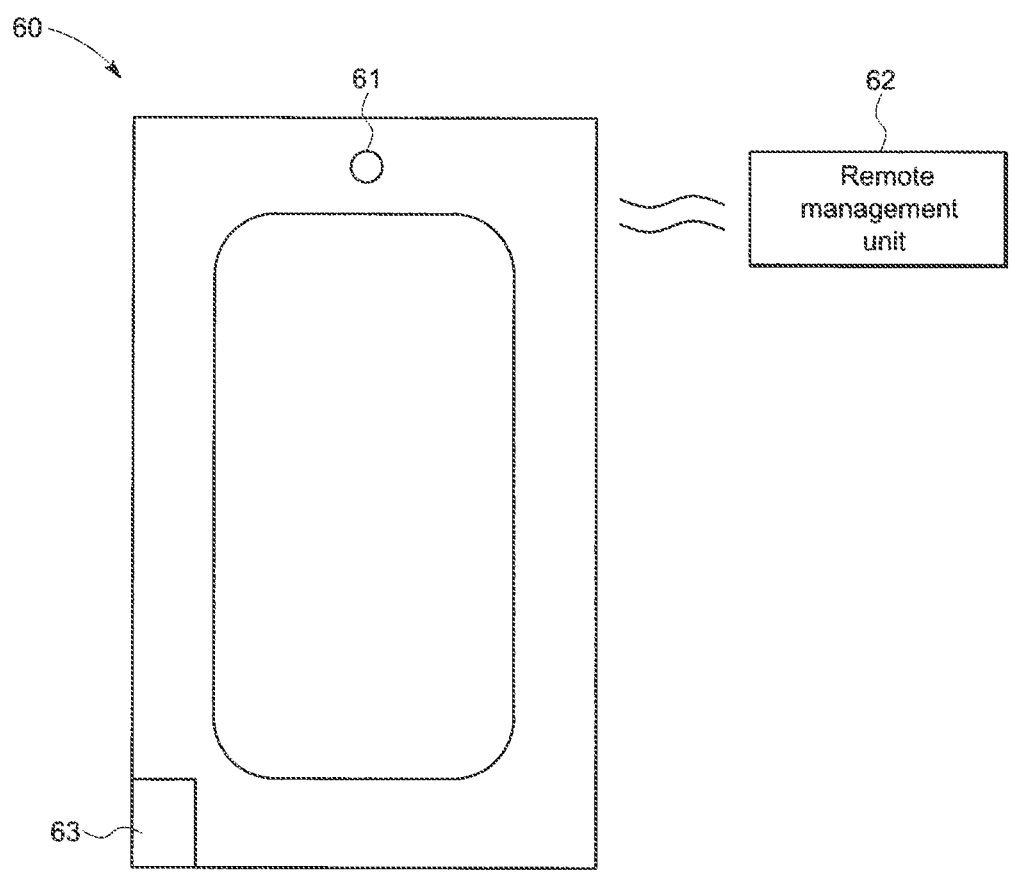
FIG. 4 illustrates a simplified diagram of a smart device in communication with a remote management unit, according to an embodiment of the present disclosure.

FIG. 4 illustrates a simplified diagram of a smart device 60 in communication with a remote management unit 62, according to an embodiment of the present disclosure. The smart device 60 may include an imaging device 61 and a location-determination device 63, as described above. The remote management unit 62 may be a remote computing facility that includes one or more processors, servers, and/or the like. The remote management unit 62 may include an emissions test unit 50, such as the emissions test unit 14 shown and described with respect to FIG. 1. The smart device 60 may wirelessly communicate with the remote management unit 62, which may or may not be located within an operational range of a WiFi router, for example, of the smart device 60. For example, the smart device 60 may be located with an individual, while the remote management unit 62 may be located within a central hub location, which may be hundreds or even thousands of miles away from the individual. Components of the vehicle emissions test system 10, shown in FIG. 1, may be optionally apportioned between the smart device 60 and the remote management unit 62. For example, the remote management unit 62 may include an emissions database while the smart device 60 may include one or more of an exhaust detection module, a comparison module, a test analysis module, an environmental modification module, and/or a recommendation module.

Figure 5:
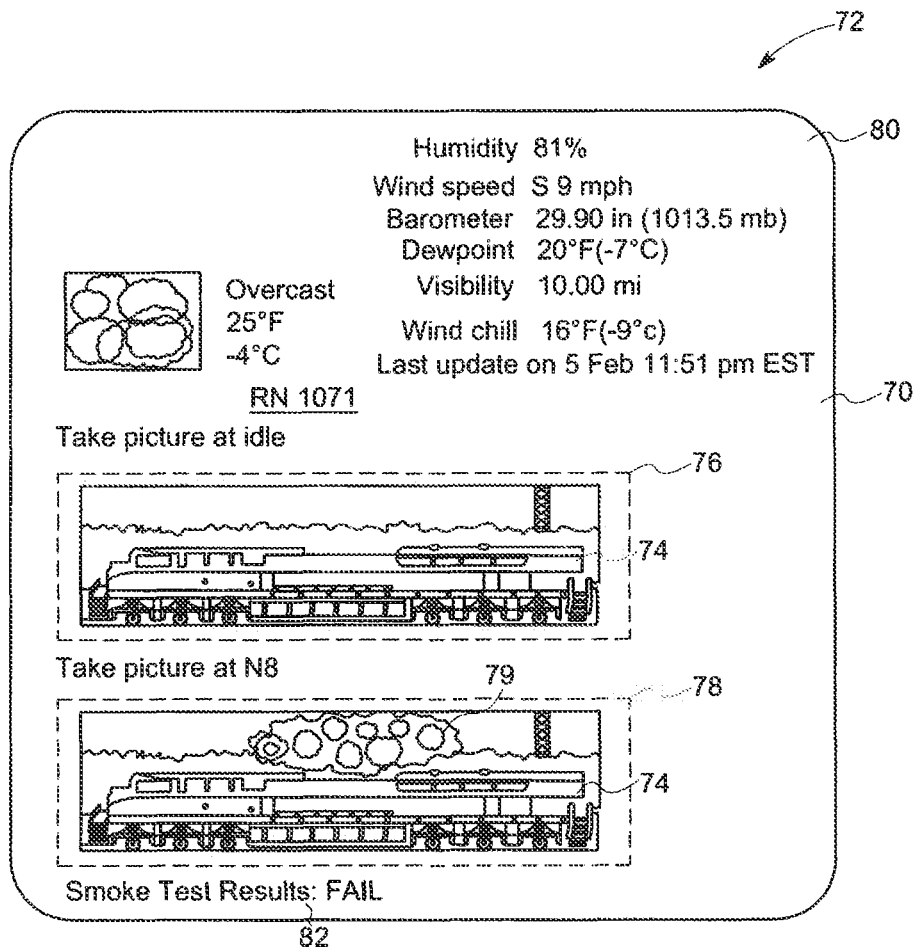
FIG. 5 illustrates a display of a vehicle emissions test system, according to an embodiment of the present disclosure.

FIG. 5 illustrates a display 70 of a vehicle emissions test system 72, according to an embodiment of the present disclosure. The vehicle emissions test system 72 may be similar to any of those described above. The display 70 may be that of a smart device, for example.

The display 70 may show prompts that instruct an individual to take a picture of a vehicle 74, such as a locomotive, at idle. The display may also show prompts that instruct the individual to take another picture of the vehicle 74 at an elevated engine state, such as Notch-8 for a locomotive. The idle picture 76 and the elevated engine picture 78 may be shown on the display. The elevated engine picture 78 may show the exhaust 79 emitted from the vehicle 74. Additionally, environmental conditions 80 of the location of the vehicle 74 may also be displayed. The environmental conditions 80 may include air temperature, humidity, wind speed, barometric pressure, dew point, visibility, wind chill, and the like, which may be used by an environmental modification module to modify or otherwise adjust one or more of exhaust data, emissions control parameter levels, and/or the test results. Test results 82 may be shown on the display 70. While the display 70 is shown as part of a smart device, it is to be understood that the display 70 may be part of a computer system that is separate and distinct from an imaging device.

Figure 6:
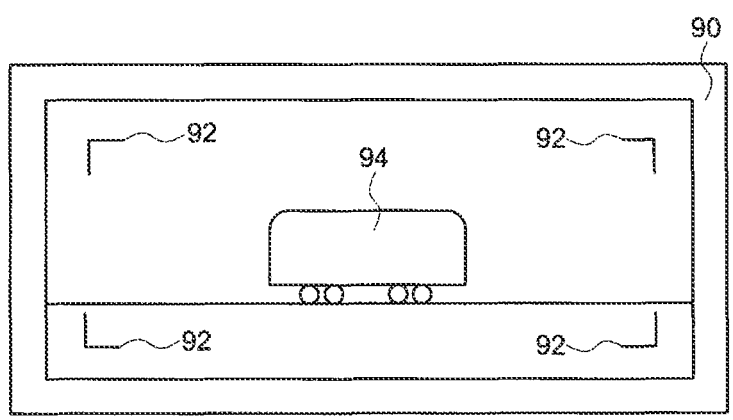
FIG. 6 illustrates an image-viewing screen of an imaging device, according to an embodiment of the present disclosure.

FIG. 6 illustrates an image-viewing screen 90 of an imaging device, according to an embodiment of the present disclosure. The image-viewing screen 90 may be part of a display of a smart device, for example.

A test analysis module, such as the test analysis module 22 of FIG. 1, may provide boundaries 92, such as brackets, lines, borders, and/or the like, on the image-viewing screen 90. The test analysis module may instruct an individual to ensure that an image of a vehicle 94 is within the boundaries 92 before image acquisition. Providing the image of the vehicle 94 within the boundaries 92 ensures that the emitted exhaust data is consistently applied to standard emissions control parameter levels stored within the emissions database.

Figure 7:
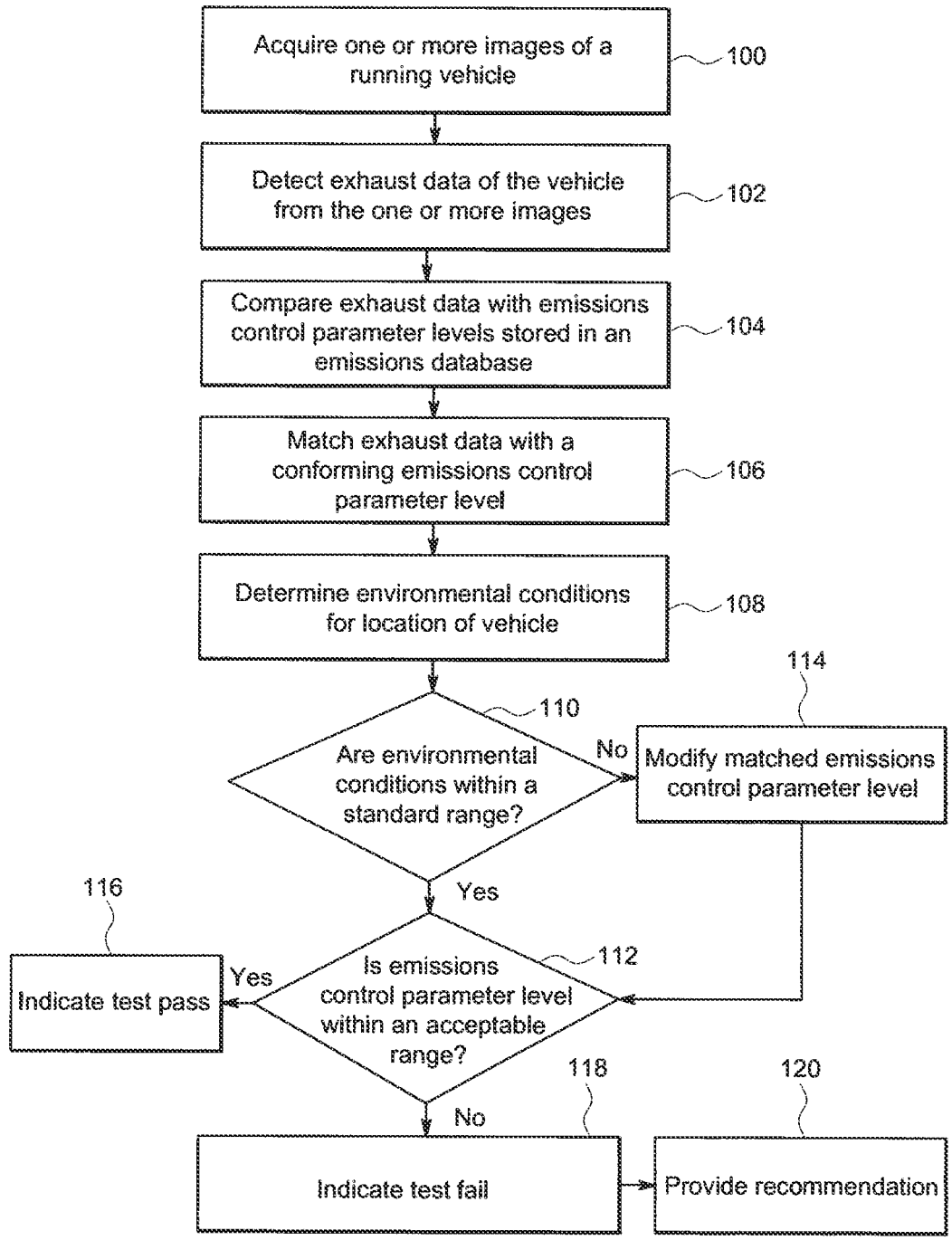
FIG. 7 illustrates a flow chart of a vehicle emissions test method, according to an embodiment of the present disclosure.

FIG. 7 illustrates a flow chart of a vehicle emissions test method, according to an embodiment of the present disclosure. Prior to the method beginning, at 100, one or more images of a running vehicle are acquired. For example, a first image of the vehicle idling may be acquired, and a second image of the vehicle running at an elevated engine level may be acquired.

The method begins at 102, where exhaust data of the vehicle is detected from the one or more images. For example, an exhaust detection module 18 may detect exhaust data from the image based on color, density, shading, and/or the like.

(As should be appreciated, from an overall process standpoint, an embodiment of a method includes both acquiring images and automatically analyzing the images for determining a vehicle emissions test result. However, since the images may be acquired manually by a human operator using a digital or other camera, embodiments of the method, in terms of steps automatically carried out by a processor-based system (for example), may be characterized in terms of receiving one or more acquired images, detecting exhaust data from the one or more images, performing an analysis of the exhaust data, and determining a vehicle emissions test result based on the analysis, as explained herein.)

At 104, the exhaust data is compared with emissions control parameter levels stored in an emissions database. For example, a comparison module may compare the exhaust data with a plurality of stored emissions control parameter data. Then, at 106, the exhaust data may be matched with a conforming or otherwise closest emissions control parameter level.

At 108, environmental conditions for the location of the vehicle may be determined. For example, the imaging device that acquires images of the vehicle may include a GPS device that pinpoints its location. The location data may be used to reference an environmental conditions system, such as a meteorological weather station, website, or the like, that may transmit environmental conditions data for the location to an environmental modification module.

If, at 110, the environmental conditions are within a standard range, the process continues to 112, in which it is determined if the matched emissions control parameter level is within an acceptable range. If, however, the environmental conditions are not within a standard range at 110, the method proceeds to 114, in which the matched emissions control parameter level is modified based on the environmental conditions. The method then proceeds to 112. Alternatively, the method may not include 108, 110, and 114, but may instead proceed from 106 to 112.

If, at 112, the matched emissions control parameter level is within an acceptable range, the method proceeds to 116, in which a Test Pass is indicated. If, however, the matched emissions control parameter level is not within an acceptable range, a Test Fail is indicated at 118, and the method may proceed to 120, in which a recommendation is provided. Alternatively, step 120 may be omitted.

The modules described in the present application may form, or be part of, one or more computers, circuitry, and/or the like. As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "module."

The computer or processor executes a set of instructions that are stored in one or more storage elements, in order to process data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The modules may represent circuit modules that may be implemented as hardware with associated instructions (for example, software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the modules may represent processing circuitry such as one or more field programmable gate array (FPGA), application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As described above, embodiments of the present disclosure provide systems and methods for performing a vehicle emissions test. Embodiments of the present disclosure provide systems and methods that may utilize one or more modules to match exhaust data with stored emissions control parameter levels to accurately, objectively, and efficiently determine whether a vehicle has passed an emissions test. Unlike prior methods of manually comparing exhaust with emissions templates, sheets, screens, or the like, embodiments of the present disclosure are less susceptible to human error and subjectivity.

Certain embodiments of the present disclosure provide a system that comprises an emissions test unit configured to receive, from an imaging device, at least one image of the vehicle that emits exhaust. The emissions test unit comprises at least one processor configured to detect exhaust data from the image(s) and determine a vehicle emissions test result through an analysis of the exhaust data. In another embodiment, the system further comprises the imaging device, which is configured to acquire the at least one image of the vehicle; for example, the emissions test unit and imaging device may be co-located in a common housing. In either case (emissions test unit by itself, or in conjunction with the imaging device), the system may include a housing in which the emissions test unit (and, in embodiments, the imaging device) is housed, and which is handheld and portable.

In another embodiment, the imaging device is configured to acquire the at least one image as a digital image, and/or as an image in a human-visible spectrum. In another embodiment, additionally or alternatively, the image is an image external to the vehicle, e.g., an exterior image of the vehicle. Imaging devices configured to acquire digital, human visible spectrum images include digital cameras, such as digital SLR's and digital cameras that are built into devices that perform functions other than image capture (e.g., mobile phones, tablet computers).

The system may also include an emissions database. The processor(s) may be further configured to compare the exhaust data with a plurality of emissions control parameter levels stored in the emissions database and match the exhaust data with a particular one of the plurality of emissions control parameter levels.

In at least one embodiment, the processor(s) may be further configured to account for environmental conditions when determining the vehicle emissions test result. Additionally, the processor(s) may be further configured to provide a recommendation based on the vehicle emissions test result. The recommendation may relate to one or more of a future vehicle emissions test, continued operation of the vehicle, a modification to the vehicle, and/or maintenance (such as oil changes, engine cleaning, and/or the like) of the vehicle.

In at least one embodiment, the imaging device and the emissions test unit are contained within a common housing. For example, the imaging device and the emissions test may be part of a smart device, such as a smart phone or tablet. Alternatively, the imaging device may be remote from the emissions test unit.

The vehicle may be or include a locomotive. Alternatively, the vehicle may be or include an automobile, bus, motorcycle, aircraft, powered boat, or the like.

Certain embodiments of the present disclosure provide a method that comprises receiving one or more images (e.g., digital images) of a vehicle at an emissions test unit (the vehicle emits exhaust), and using at least one processor to: detect exhaust data from the image(s), perform an analysis of the exhaust data (i.e., analyze the exhaust data), and determine a vehicle emissions test result based on the analysis of the exhaust data.

The method may also include using the processor(s) to compare the exhaust data with a plurality of control parameter levels stored in the emissions database, and match the exhaust data with a particular one of the plurality of control parameter levels.

The method may also include using the processor(s) to account for environmental conditions when determining the vehicle emissions test result.

The method may also include using the processor(s) to provide a recommendation based on the vehicle emissions test result. The recommendation may relate to one or more of a future vehicle emissions test, continued operation of the vehicle, a modification to the vehicle, and/or maintenance of the vehicle.

Certain embodiments of the present disclosure provide a system that may include an imaging device configured to acquire at least one image of a vehicle that emits exhaust, and an emissions test unit configured to receive the image(s) of the vehicle. The emissions test unit may include an exhaust detection module configured to detect exhaust data from the image(s), and a test analysis module configured to determine a vehicle emissions test result through an analysis of the exhaust data.

In at least one embodiment, the emissions test unit may also include an emissions database that stores a plurality of emissions control parameter levels, and a comparison module configured to compare the exhaust data with the plurality of emissions control parameter levels stored in the emissions database and match the exhaust data with a particular one of the plurality of emissions control parameter levels. The test analysis module determines the vehicle emissions test result through the match.

In at least one embodiment, the emissions test unit may also include an environmental modification module configured to modify one or more of the exhaust data, the plurality of emissions control parameter levels, or the vehicle emissions test result based on environmental conditions of a location of the vehicle.

In at least one embodiment, the emissions test unit may also include a recommendation module configured to provide a recommendation based on the vehicle emissions test result. The recommendation may relate to one or more of a future vehicle emissions test, continued operation of the vehicle, a modification to the vehicle, and/or maintenance of the vehicle.

Another embodiment relates to a system comprising a handheld, portable housing, an imaging device, and an emissions test unit. The imaging device is housed in the housing and is configured to acquire images of an exterior of a locomotive or other vehicle that emits exhaust to the atmosphere. The emissions test unit is housed in the housing and is electrically coupled to the imaging device to receive the images of the vehicle. The emissions test unit includes at least one processor configured to: detect exhaust data from the at least one image; determine a vehicle emissions test result through an analysis of the exhaust data; and generate an output signal of the emissions test result, e.g., the output signal may be for controlling a display connected to the housing to display the test result.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosure without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the disclosed subject matter should, therefore, be determined with reference to the appended claims, along with the full scope of equivalents to which such claims are entitled. In the appended claims, the terms "including," "includes," and "in which" are used as the plain-English equivalents of the respective terms "comprising," "comprises," and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose several embodiments of the disclosure, and also to enable a person of ordinary skill in the art to practice the embodiments of disclosure, including making and using any devices or systems and performing any incorporated methods. The patentable scope of the disclosure is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the disclosure herein involved, it is intended that all of the subject matter of the above description or shown in the accompanying drawings shall be interpreted merely as examples illustrating the inventive concept herein and shall not be construed as limiting the disclosure.

What is claimed is:

1. A system comprising:
    an imaging device, the imaging device configured to acquire at least one image of a vehicle that emits exhaust;
    an emissions test unit configured to receive, from the imaging device, the at least one image of the vehicle that emits exhaust, wherein the emissions test unit includes at least one processor configured to detect exhaust data from the at least one image and determine a vehicle emissions test result through an analysis of the exhaust data, wherein the imaging device and the emissions test unit are part of a handheld, portable smart device; and
    an emissions database that stores a plurality of emissions control parameter levels including one or both of known exhaust colors or known exhaust densities associated with various levels of emissions, wherein the at least one processor is further configured to compare the exhaust data with the plurality of emissions control parameter levels and match the exhaust data with a particular one of the plurality of emissions control parameter levels.

2. The system of claim 1, wherein the at least one processor is further configured to account for environmental conditions when determining the vehicle emissions test result.

3. The system of claim 1, wherein the at least one processor is further configured to provide a recommendation based on the vehicle emissions test result, wherein the recommendation relates to one or more of a future vehicle emissions test, continued operation of the vehicle, a modification to the vehicle, or maintenance of the vehicle.

4. The system of claim 1, wherein the imaging device and the emissions test unit are contained within a common housing.

5. The system of claim 1, wherein the imaging device is remote from the emissions test unit.

6. The system of claim 1, wherein the imaging device is configured to acquire the at least one image as a digital image.

7. The system of claim 1, wherein the emissions control parameter levels include the known exhaust colors and the known exhaust densities associated with various levels of emissions.

8. A method comprising:
    acquiring at least one image of a vehicle that emits exhaust with an imaging device;
    receiving, at an emissions test unit, the at least one image of the vehicle that emits exhaust, wherein the imaging device and the emissions test unit are part of a handheld, portable smart device; and
    using at least one processor of the emissions test unit to:
        detect exhaust data from the at least one image;
        perform an analysis of the exhaust data;
        determine a vehicle emissions test result based on the analysis of the exhaust data;
        compare the exhaust data with a plurality of emissions control parameter levels including one or both of known exhaust colors or known exhaust densities associated with various levels of emissions stored in an emissions database accessible by the at least one processor; and
        match the exhaust data with a particular one of the plurality of emissions control parameter levels.

9. The method of claim 8, further comprising using the at least one processor to account for environmental conditions when determining the vehicle emissions test result.

10. The method of claim 8, further comprising using the at least one processor to provide a recommendation based on the vehicle emissions test result, wherein the recommendation relates to one or more of a future vehicle emissions test, continued operation of the vehicle, a modification to the vehicle, or maintenance of the vehicle.

11. The method of claim 8, wherein the at least one image is a digital image.

12. The method of claim 8, wherein the emissions control parameter levels include the known exhaust colors and the known exhaust densities associated with various levels of emissions.

13. A system comprising:
   an imaging device configured to acquire at least one image of a vehicle that emits exhaust; and
   an emissions test unit configured to receive the at least one image of the vehicle, wherein the imaging device and the emissions test unit are part of a handheld, portable smart device, wherein the emissions test unit includes:
   (i) an exhaust detection module configured to detect exhaust data from the at least one image;
   (ii) a test analysis module configured to determine a vehicle emissions test result through an analysis of the exhaust data;
   (iii) an emissions database that stores a plurality of emissions control parameter levels including one or both of known exhaust colors or known exhaust densities associated with various levels of emissions; and
   (iv) a comparison module configured to compare the exhaust data with the plurality of emissions control parameter levels stored in the emissions database and match the exhaust data with a particular one of the plurality of emissions control parameter levels,
   wherein the test analysis module is configured to determine the vehicle emissions test result through the match.

14. The system of claim 13, wherein the emissions test unit further comprises an environmental modification module configured to modify one or more of the exhaust data, the plurality of emissions control parameter levels, or the vehicle emissions test result based on environmental conditions of a location of the vehicle.

15. The system of claim 13, wherein the emissions test unit further comprises a recommendation module configured to provide a recommendation based on the vehicle emissions test result, wherein the recommendation relates to one or more of a future vehicle emissions test, continued operation of the vehicle, a modification to the vehicle, or maintenance of the vehicle.

16. The system of claim 13, wherein the imaging device and the emissions test unit are contained within a common housing.

17. The system of claim 13, wherein the imaging device is remote from the emissions test unit.

18. The system of claim 13, wherein the emissions control parameter levels include the known exhaust colors and the known exhaust densities associated with various levels of emissions.

* * * * *